US009649957B2

(12) United States Patent
Seibold et al.

(10) Patent No.: US 9,649,957 B2
(45) Date of Patent: May 16, 2017

(54) SECOND ROW VEHICLE SEAT

(75) Inventors: Kurt A. Seibold, Whitemore Lake, MI (US); Duane Potes, Jr., Adrian, MI (US); John Gomez, Howell, MI (US); Joseph A. Gasko, Commerce Township, MI (US); Jeffrey David Laho, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 21 days.

(21) Appl. No.: 13/993,125

(22) PCT Filed: Dec. 16, 2011

(86) PCT No.: PCT/US2011/065495
§ 371 (c)(1),
(2), (4) Date: Jun. 12, 2013

(87) PCT Pub. No.: WO2012/083167
PCT Pub. Date: Jun. 21, 2012

(65) Prior Publication Data
US 2013/0257113 A1 Oct. 3, 2013

Related U.S. Application Data

(60) Provisional application No. 61/424,226, filed on Dec. 17, 2010.

(51) Int. Cl.
*B60N 2/42* (2006.01)
*B60N 2/18* (2006.01)
(Continued)

(52) U.S. Cl.
CPC ......... *B60N 2/4221* (2013.01); *B60N 2/1821* (2013.01); *B60N 2/1835* (2013.01);
(Continued)

(58) Field of Classification Search
CPC ...... B60N 2/1821; B60N 2/1835; B60N 2/22; B60N 2/3013; B60N 2/3065; B60N 2/4221; B60N 2/44
(Continued)

(56) References Cited

U.S. PATENT DOCUMENTS 4,781,414 A * 11/1988 Periou .......................... 297/313
5,022,707 A *  6/1991 Beauvais et al. .......... 297/216.2
(Continued)

FOREIGN PATENT DOCUMENTS

WO        2005102772 A2    11/2005

*Primary Examiner* — Leslie A Nicholson, III
*Assistant Examiner* — Ryan A Doyle
(74) *Attorney, Agent, or Firm* — Dickinson Wright PLLC

(57) ABSTRACT

A seat assembly for a vehicle including a base presenting a pair of opposing angular surfaces spaced from one another and a cushion slidably engaging the opposing angular surfaces for tilting relative to the base into alternate orientations. The seat also includes a resistance element for maintaining the cushion in a desired orientation relative to the base. The cushion includes a sliding element which is movable between a disengaged position for adjusting the orientation of the cushion within predetermined limits established by the angular surfaces and an engaged position where the sliding element interfaces with the resistance element to restrict movement of the cushion relative to the base.

17 Claims, 14 Drawing Sheets

(51) Int. Cl.
*B60N 2/22* (2006.01)
*B60N 2/30* (2006.01)
*B60N 2/44* (2006.01)

(52) U.S. Cl.
CPC ............ *B60N 2/22* (2013.01); *B60N 2/3013* (2013.01); *B60N 2/3065* (2013.01); *B60N 2/44* (2013.01)

(58) Field of Classification Search
USPC .............. 297/183.1, 216.1, 216.15–216.16, 297/216.18–216.19, 284.11, 311, 313
See application file for complete search history.

(56) References Cited

U.S. PATENT DOCUMENTS

| | | | |
|---|---|---|---|
| 5,244,252 A | | 9/1993 | Serber |
| 5,437,494 A | * | 8/1995 | Beauvais .................. 297/216.19 |
| 5,449,218 A | * | 9/1995 | Beauvais et al. ........ 297/216.19 |
| 5,567,006 A | | 10/1996 | McCarthy |
| 5,967,604 A | * | 10/1999 | Yoshida et al. .......... 297/216.19 |
| 6,086,154 A | | 7/2000 | Mathey et al. |
| 6,334,648 B1 | * | 1/2002 | Girsberger et al. ...... 297/216.19 |
| 6,578,917 B1 | * | 6/2003 | Aubert et al. ................ 297/317 |
| 6,817,645 B2 | | 11/2004 | Taguchi et al. |
| 7,390,060 B2 | * | 6/2008 | Kristen ......................... 297/343 |
| 7,918,501 B1 | * | 4/2011 | Hanson et al. ............. 297/216.2 |
| 8,556,346 B2 | * | 10/2013 | Line et al. .................... 297/327 |
| 2005/0242634 A1 | * | 11/2005 | Serber ........................ 297/216.1 |
| 2006/0055214 A1 | * | 3/2006 | Serber ........................ 297/216.1 |
| 2012/0305734 A1 | * | 12/2012 | Balin et al. ................... 248/430 |

\* cited by examiner

2 PIECE CURVED TRACK SYSTEM

SECOND ROW VEHICLE SEAT

CROSS-REFERENCE TO PRIOR APPLICATION

This U.S. National Stage Patent Application claims the benefit of International Application serial number PCT/US11/65495 filed Dec. 16, 2011, entitled "Second Row Vehicle Seat" and U.S. Provisional Patent Application Ser. No. 61/424,226 filed Dec. 17, 2010, entitled "Second Row Vehicle Seat," the entire disclosures of the applications being considered part of the disclosure of this application, and hereby incorporated by reference.

BACKGROUND OF THE INVENTION

1. Field of the Invention

The invention relates to a seat assembly for a vehicle. More specifically, the present invention relates to a compact seat assembly that can comfortably accommodate substantially any occupant in the second row of a vehicle.

2. Brief Description of the Related Art

To increase the versatility of vehicles, many modern vehicles include seats that fold or collapse. These seats commonly are designed to move to a stowed position to maximize cargo space in the vehicle. One problem with many stowable or compact vehicle seats and, in particular rear vehicle seats, is that they are currently only comfortable for a limited segment of the population. As vehicles become more compact and consumers demand more functionality from their vehicles, manufacturers strive to improve the comfort of these seats for a wider segment of the population.

One issue with improving the comfort of stowable and compact seats is that various design configurations and requirements prevent or limit designers from incorporating many comfort features that are often used in the front seats of vehicles. For example, space and folding requirements may prevent or limit certain features from being included in rear vehicle seats. In addition, given that most rear seats in vehicles are occupied less frequently than the front seats, manufacturers generally desire to reduce or minimize the weight of the rear seats to improve the vehicle's fuel economy. Other comfort features found in the front seats, such as power tilt for adjusting the angle of the lower seat cushion are generally not cost effective for the rear seats of most vehicles.

Another issue with stowable rear vehicle seats is that they are generally unable to comfortably accommodate tall occupants. Specifically, due to space constraints between the rear and front seats, tall occupants do not have thigh support with their feet on the floor of the vehicle. While minimizing space, minimizing cost and maximizing comfort are important for rear vehicle seats, it is imperative that the seat also be resistant to failure during crashes, such as front-impact collisions.

SUMMARY OF THE INVENTION

According to one aspect of the invention, a vehicle seat includes a base presenting a pair of opposing angular surfaces spaced from one another and a cushion slidably engaging the opposing angular surfaces for tilting relative to the base to alternate orientations. The seat also includes a resistance element for maintaining the cushion in a desired orientation relative to the base. The cushion also includes a sliding element moveable between a disengaged position for allowing adjustment of the orientation of the cushion within predetermined limits established by the angular surfaces and an engaged position where the sliding element interfaces with the resistance element such that the cushion is restricted from movement relative to the base.

According to another aspect of the invention, the seat is for a back row of a vehicle having a floor pan with an anti-submarine hump. The seat includes a base mounted to the floor pan of the vehicle adjacent to and at least partially rearward of the anti-submarine hump, and the base also includes a track. The seat further includes a lower cushion operably coupled to the track for rocking along the track relative to the base. The track defines the limits of the rocking, but throughout the limits of the rocking, at least a portion of the lower cushion is disposed rearward of the anti-submarine hump. The seat also includes a latching or braking mechanism having a disengaged position for allowing the lower cushion to rock relative to the base and an engaged position for restricting movement of the lower cushion relative to the base.

The seat is advantageous because it uses the anti-submarine hump of the floor pan to absorb forces from the seat in the event of a front-impact collision, thus allowing the other components of the seat to be made of cheaper, weaker materials, without compromising the seat's resistance to failure during front-impact collisions.

The seat is particularly useful for compact or sub-compact vehicles, where space reduction and cost reduction are of crucial importance. The rocking of the seat allows it to comfortably accommodate occupants of virtually any height, and the seat accomplishes this with little to no additional space or cost compared to a comparable non-rocking seat. Larger occupants might prefer to have the lower cushion be disposed at a greater incline, whereas smaller occupants might prefer to have the lower cushion be disposed at a lower incline.

According to yet another aspect of the invention, the seat includes a braking mechanism with a towel bar and a bracket. The base presents a plurality of teeth-like grooves, and the lower cushion engages the grooves whenever the towel bar is in a down position to restrict movement of the lower cushion relative to the base. However, when the towel bar is raised to the up position, the lower cushion is disengaged from the grooves, thereby allowing the lower cushion to rock relative to the base. Thus, the process for rocking the seat is very simple.

According to a further aspect of the invention the track of the base includes a pair of slots angled relative to one another and angled relative to the floor pan of the vehicle. Thus, when the braking mechanism is in a disengaged position, the occupant simply has to tilt their thigh to rock backward or forward. Thus, adjustment of the lower cushion requires very little effort from the occupant.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF A PREFERRED EMBODIMENT

Figure 1:
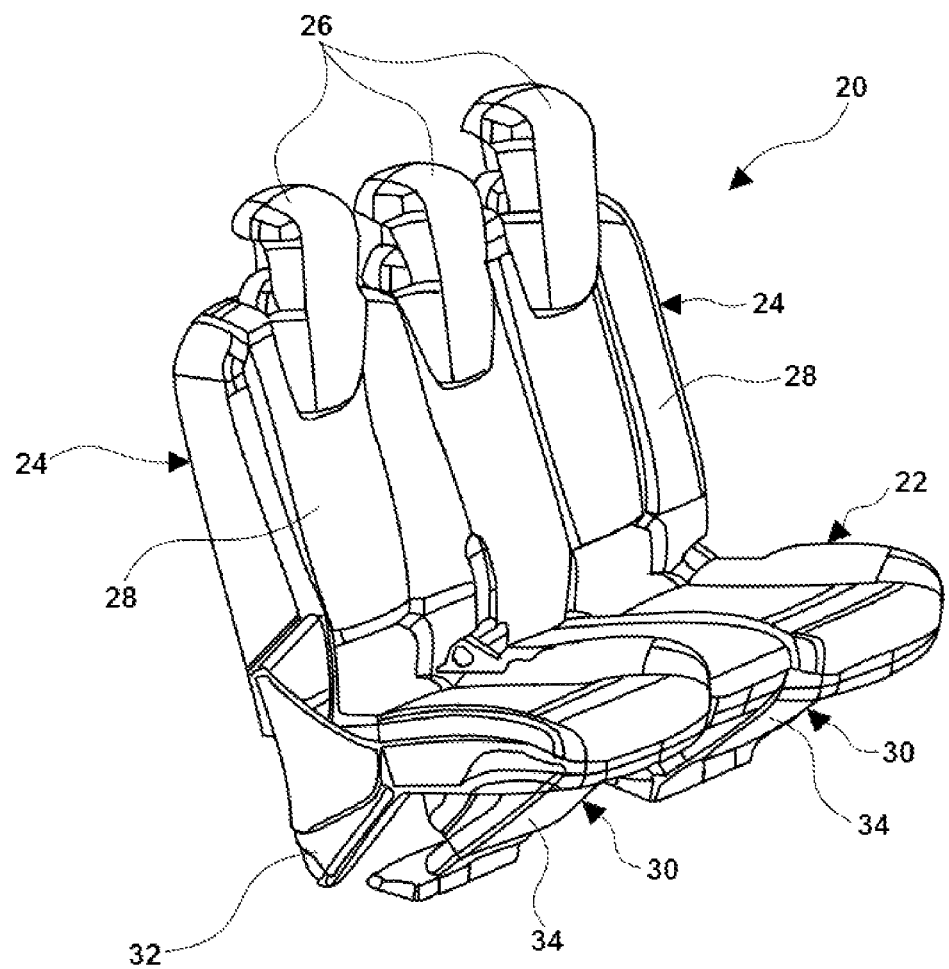
FIG. 1 is a perspective view of a pair of the seat assemblies in an upright position.

Referring to the Figures, wherein like numerals indicate like or corresponding parts throughout the several views, a first exemplary rear vehicle seat assembly 20 is generally shown in FIG. 1. The seat assembly 20 is preferably disposed in the second or third row of seats of a car or a sport utility vehicle. However, it should be appreciated that the seat assembly 20 could also find uses in trucks, busses, trains, airplanes or any other type of vehicle.

The seat assembly 20 includes a lower cushion 22, a seat back 24 and a headrest 26. The seat back 24 includes a back frame (not shown), and the lower cushion 22 includes a lower frame 30. The frames are rotatably attached to one another and provide support for a core (not shown) and a trim cover 28, as will be understood by those of skill in the art. As will be discussed in further detail below, the lower frame 30 includes a base 32 and a pair of adjustable legs 34. The lower frame 30 is preferably made of metal; however, it should be appreciated that any other material capable of providing the necessary structural support for the seat assembly 20 may be employed. In FIGS. 1-8, a cover is disposed about the adjustable legs 34 of the lower frame 30 for protecting the adjustable legs 34 from dirt or other elements and for aesthetic purposes.

The core is disposed between the frame and the trim cover 28 and is preferably of a foam material such as polypropylene, polyurethane or expanded polypropylene for comfortably supporting the passenger. The trim cover 28 is disposed around the frame and core and is preferably of leather or fabric, but could alternately be of a wide variety of other materials, as will be appreciated by those of skill in the art.

Figure 2:
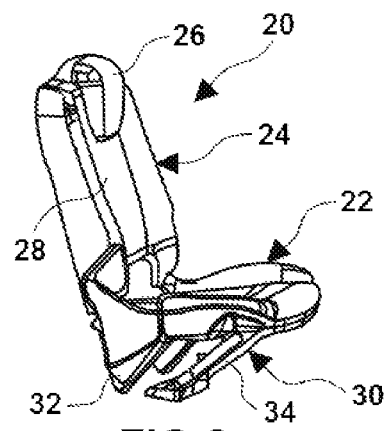
FIG. 2 is a perspective view of the seat assembly in an upright position.
Figure 3:
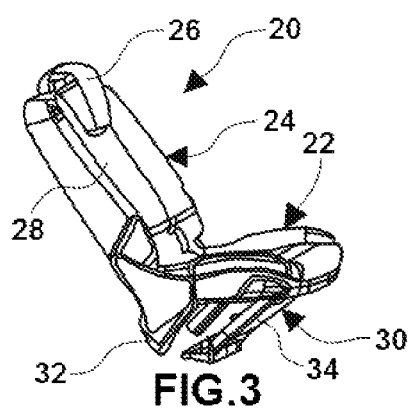
FIG. 3 is a perspective view of the seat assembly with the seat back in a reclined position.
Figure 4:
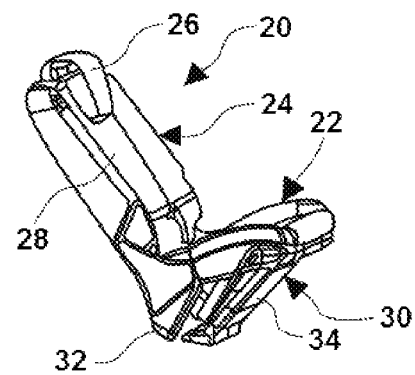
FIG. 4 is a perspective view of the seat assembly with the lower cushion in an inclined position.
Figure 5:
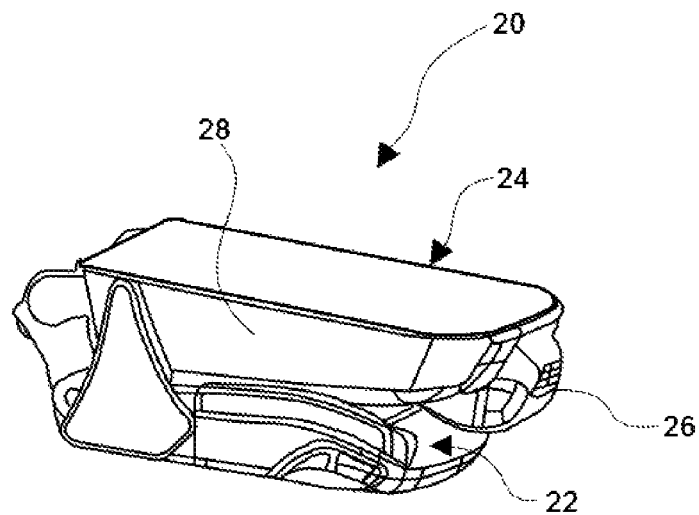
FIG. 5 is a perspective view of the seat assembly in a stowed position.

The exemplary seat assembly 20 can be adjusted through a wide range of positions to accommodate virtually any sized occupant. For example, as illustrated in FIGS. 1 and 2, the seat assembly 20 is in an upright seating position with the lower cushion 22 extending generally parallel to the floor (not shown) of the vehicle and with the seat back 24 being reclined backwards as compared to the upright seating position. The seat assembly 20 is shown in FIG. 3 in a reclined position with the seat back 24 being disposed at a greater angle relative to the lower cushion 22 than the upright seating position. FIG. 4 shows the seat assembly 20 in an inclined position with the lower seat assembly 20 extending upwardly at an angle relative to the floor of the vehicle. In FIG. 5, the seat assembly 20 is in a stowed position with the seat back 24 being folded forwardly to engage the lower cushion 22. In the stowed position, both the lower cushion 22 and the seat back 24 extend in generally parallel relationship with one another and with the floor of the vehicle.

Figure 6:
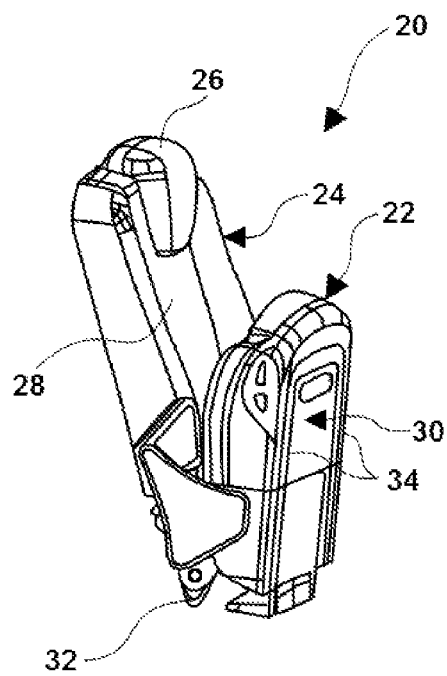
FIG. 6 is a perspective view of the seat assembly in a stadium position.

Referring now to FIG. 6, the seat assembly 20 is shown in a stadium position with the lower cushion 22 extending perpendicularly away from the floor of the vehicle. The adjustable legs 34 of the lower frame 30 can rotate or extend to move the lower cushion 22 through any position from the stowed position of FIG. 5 to the stadium position of FIG. 6. Optionally, a spring (not shown) may be included to assist in moving the lower seat portion 22 into or out of the stadium position.

Figure 7:
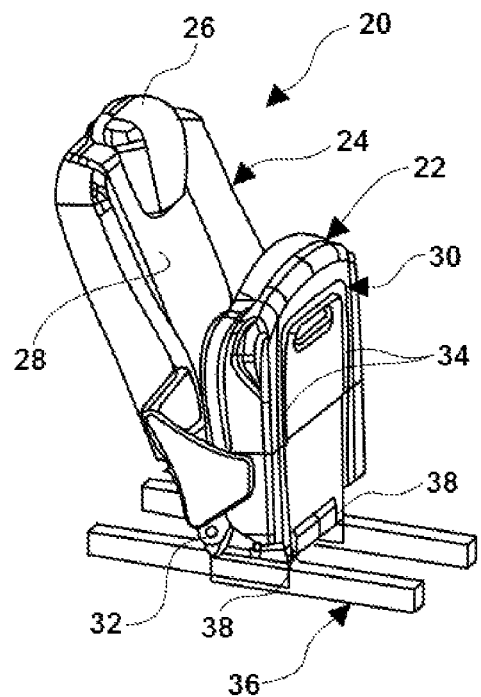
FIG. 7 is a perspective view of the seat assembly in the stadium position and moved longitudinally backward along a track mechanism.
Figure 8:
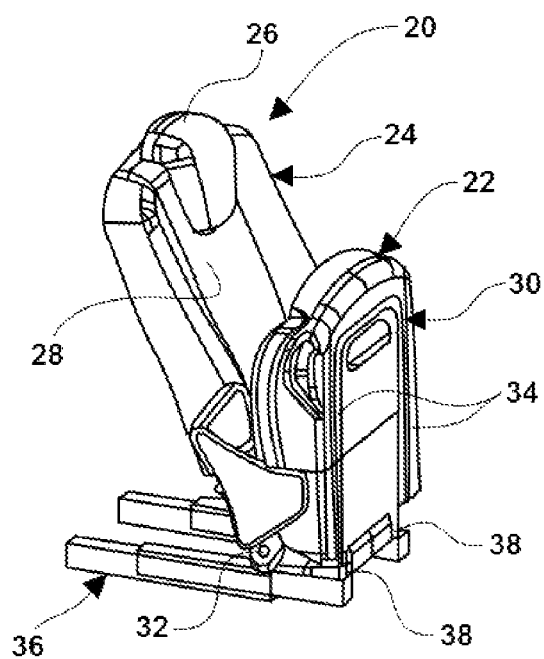
FIG. 8 is a perspective view of the seat assembly in the stadium position and moved longitudinally forward along the track mechanism.

Referring now to FIGS. 7 and 8, opposite of the lower cushion 22, the base 32 and adjustable legs 34 are attached to a track assembly 36 for moving the seat assembly 20 longitudinally forward or backwards. The track assembly 36 could be a manual track, an electrically powered track, or any other type of mechanism for moving the seat assembly 20 longitudinally forward and backward. In FIG. 7, the seat assembly 20 is shown in the stadium position and moved longitudinally backwards on the track assembly 36, which could be a desirable position for allowing occupants to walk past the seat assembly 20 into the cabin of the vehicle. Additionally, while in the longitudinally backward position, the adjustable legs 34 can be adjusted to put the seat assembly 20 in any of the configurations shown in FIGS. 1-6 and discussed above. If the seat assembly 20 is in the most rearward position along the track assembly 36 and the lower seat cushion 22 is in the inclined position of FIG. 4, the seat may be most comfortable for extremely tall occupants who require lots of leg room.

Referring now to FIG. 8, the seat assembly 20 is shown in the stadium position and moved longitudinally forward as compared to the position shown in FIG. 7. If the seat assembly 20 is in the back row of a vehicle, then this position has the effect of expanding the trunk of that vehicle. If the seat assembly 20 is in a middle row of a vehicle, then this position allows an occupant to more easily reach the rear rows of the vehicle.

Figure 9:
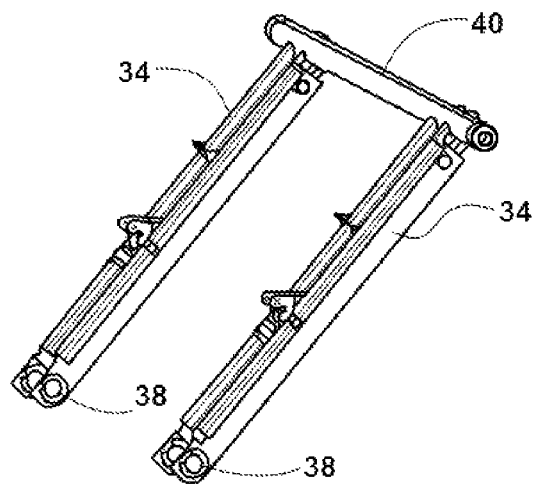
FIG. 9 is a perspective view of the adjustable legs of the lower frame of the seat assembly in a fully contracted position.
Figure 10:
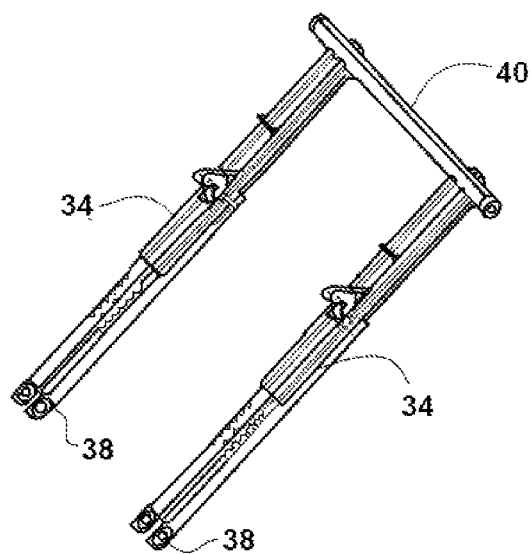
FIG. 10 is a perspective view of the adjustable legs of the lower frame of the seat assembly in a fully extended position.

The adjustable legs 34 of the lower frame 30 extend in spaced and parallel relationship to one another from an attachment point 38 where they engage the track assembly 36 to a tube 40 engaging the lower cushion 22. Referring now to FIGS. 9 and 10, each of the adjustable legs 34 includes a telescoping mechanism for selectively extending and retracting to raise or lower the front of the lower cushion 22. Adjustment of the adjustable legs 34 is preferably done via a ratcheting system or a latching system which can lock the legs 34 at various lengths between the fully retracted length of FIG. 9 and the fully extended length of FIG. 10. Although not shown, it should be appreciated that the ratcheting system could include an inertia hold down to prevent the telescoping adjustable legs 34 from disengaging in the event of a collision. When the adjustable legs 34 are fully retracted, the lower seat cushion extends generally parallel to the floor of the vehicle, as shown in FIGS. 2 and 3. When the adjustable legs 34 are in the fully extended position, the lower cushion 22 is in the stadium position of FIG. 6. It should be appreciated that the adjustable legs 34 could also be locked in nay position between these extremes.

Figure 11:
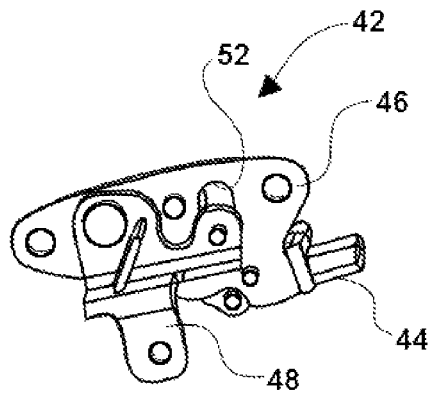
FIG. 11 is a perspective view of a first side of a release mechanism in a neutral position.
Figure 12:
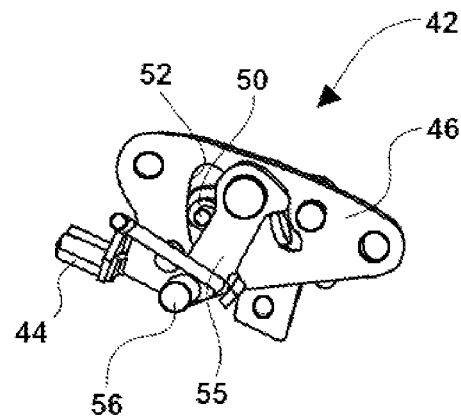
FIG. 12 is a perspective view of the a second side of the release mechanism in the neutral position.
Figure 13:
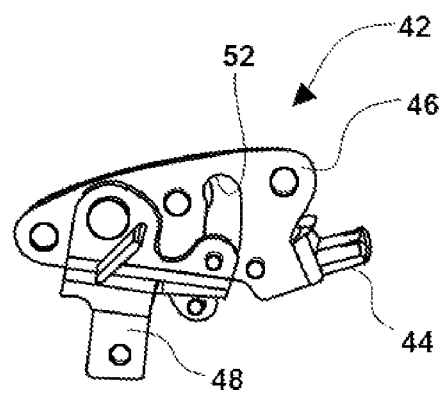
FIG. 13 is a perspective view of the first side of the release mechanism after being rotated in a clockwise direction.
Figure 14:
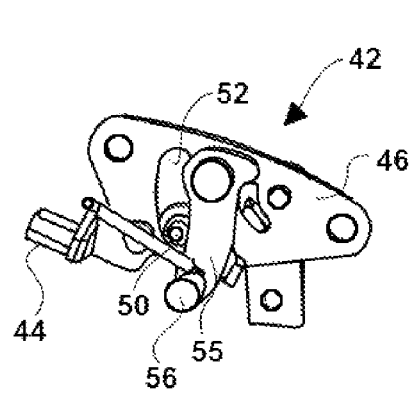
FIG. 14 is a perspective view of the second side of the release mechanism after being rotated in the clockwise direction.
Figure 15:
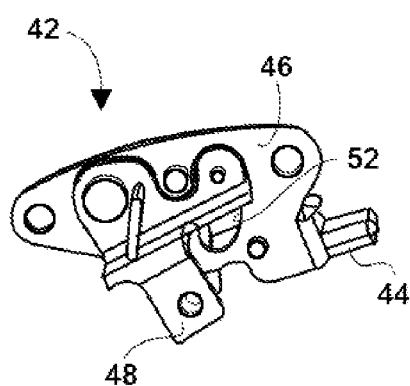
FIG. 15 is a perspective view of the first side of the release mechanism after being rotated in a counter-clockwise direction.
Figure 16:
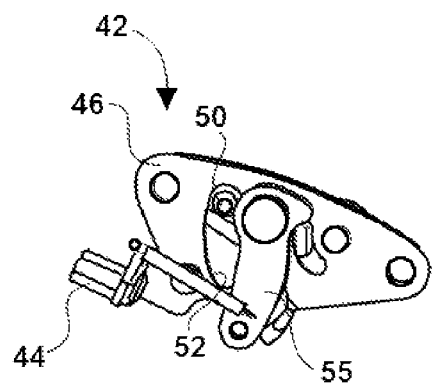
FIG. 16 is a perspective view of the second side of the release mechanism after being rotated in the counter-clockwise direction.

The seat assembly 20 further includes a release mechanism 42 for selectively adjusting the lengths of the legs 34 and thereby adjust the lower cushion 22 between the various configurations discussed above. The exemplary release mechanism 42 includes a handle (such as a towel bar), a cable attachment point 44, a fixed member 46, and a rotating member 48 and a cable release member 55. The handle is connected to the rotating member 48. A cable end fitting is attached to cable release member 55 via pin 56. A cable housing (not shown) is attached cable attachment point 44 and the adjustable legs 34 to release the adjustable legs 34 from the track assembly 36. A pin 50 is disposed on the rotating member 48, and a slot 52 for limiting travel of pin 50 is disposed on the other of the fixed member 46. FIGS. 11 and 12 show the release mechanism 42 in a neutral position; FIGS. 13 and 14 show the release mechanism 42 in a clockwise position; and FIGS. 15 and 16 show the release mechanism 42 in a counter-clockwise position. In either the clockwise or the counter-clockwise position, the cable release member 55, 56 is moved to pull the cable and release the adjustable legs 34. This allows for the handle to be lifted when the lower seat is in the flat or inclined positions or to be pulled forwardly when the seat assembly 20 is in the stowed position. In other words, the release mechanism 42 is triggered in response to the handle moving in either direction.

Figure 17:
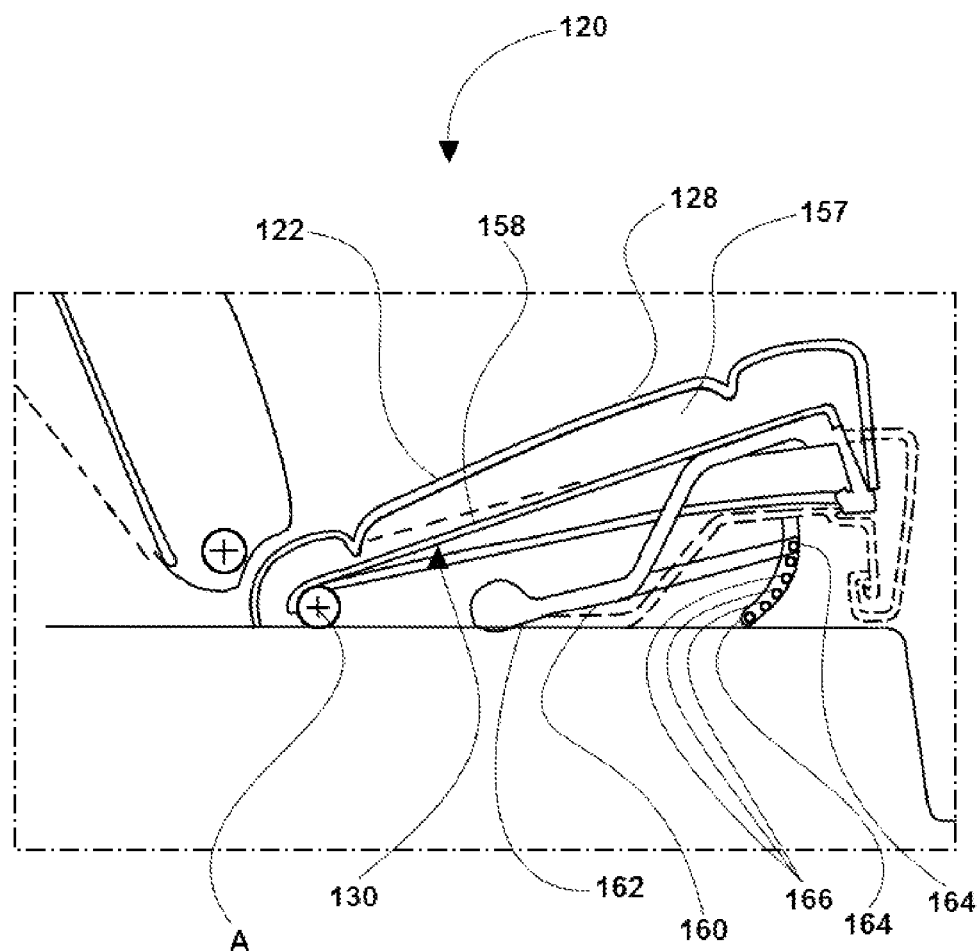
FIG. 17 is a cross-sectional view of a second embodiment of the seat assembly.

FIG. 17 is a cross-sectional view of a second exemplary embodiment of the seat assembly 120. In the second embodiment, the lower frame 130 includes a flex mat 158 extending radially outwardly from an axis A for rotating about the axis A. The core 157 and the trim cover 128 of the lower cushion 122 are disposed about the flex mat 158 for rotating with the flex mat 158 about the axis A to raise and lower the front of the lower cushion 122, i.e. to move the lower cushion 122 between an inclined position and a flat position (shown in phantom lines). A hip pivot 160 member engages the flex mat 158 for rotating about a hip pivot point 162. The hip pivot member 160 includes a locking pin 164 spaced radially from the hip pivot point 162, and the lower frame 130 presents a slot 164 having a plurality of indentations 166 for mating with the locking pin 164 of the hip pivot member 160. In operation, the hip pivot member 160 and the flex mat 158 can rotate by up to fifteen degrees (15°), and the locking pin 164 can lock the lower cushion 122 into any position within that rotation range.

Figure 18:
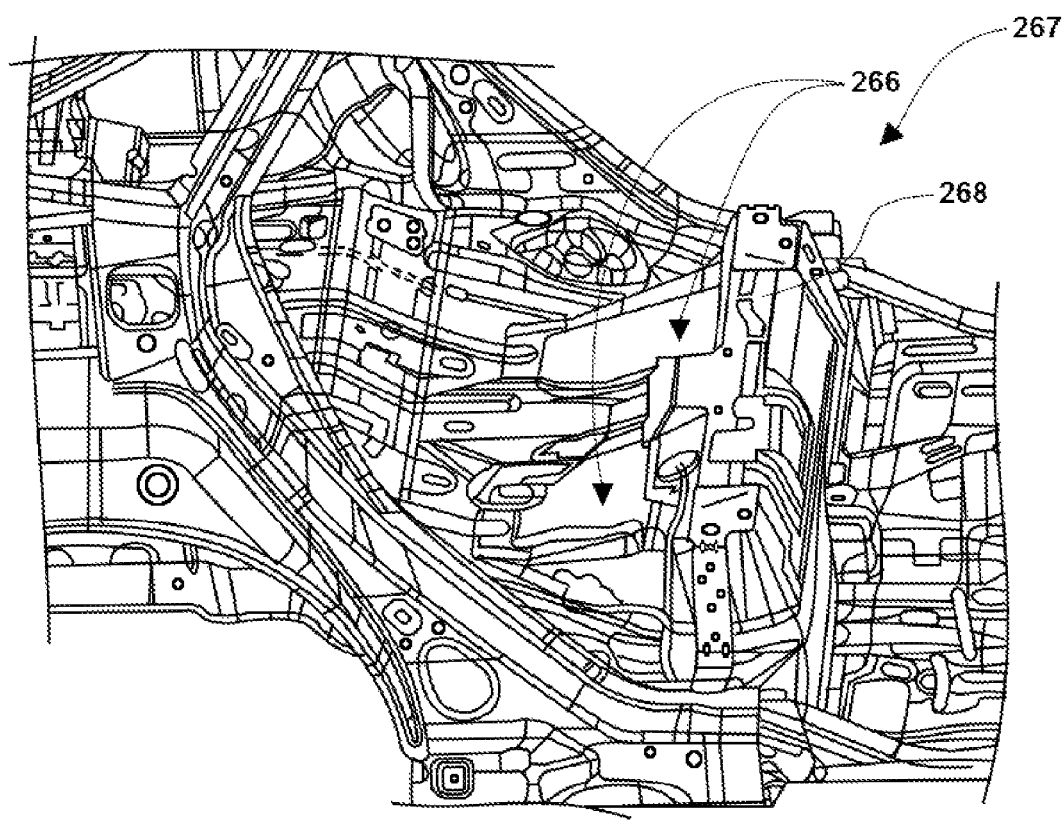
FIG. 18 is a perspective and fragmentary view of an exemplary floor pan of a vehicle.

Another aspect of the invention provides for a second row seat assembly attached directly to a raised portion 266 of a floor pan 267 of a vehicle. Referring now to FIG. 18, the raised portion 266 is disposed vertically above the lower portion of the floor pan 267 and provides an advantageous location for a second row seat, particularly in compact and sub-compact vehicles. The front of the raised portion 266 presents a hump 268 (hereinafter referred to as an "anti-submarine hump"), which as will be discussed in further detail below and serves to protect the seat assembly and impart loads from the occupant in the event of a front-impact collision.

Figure 19:
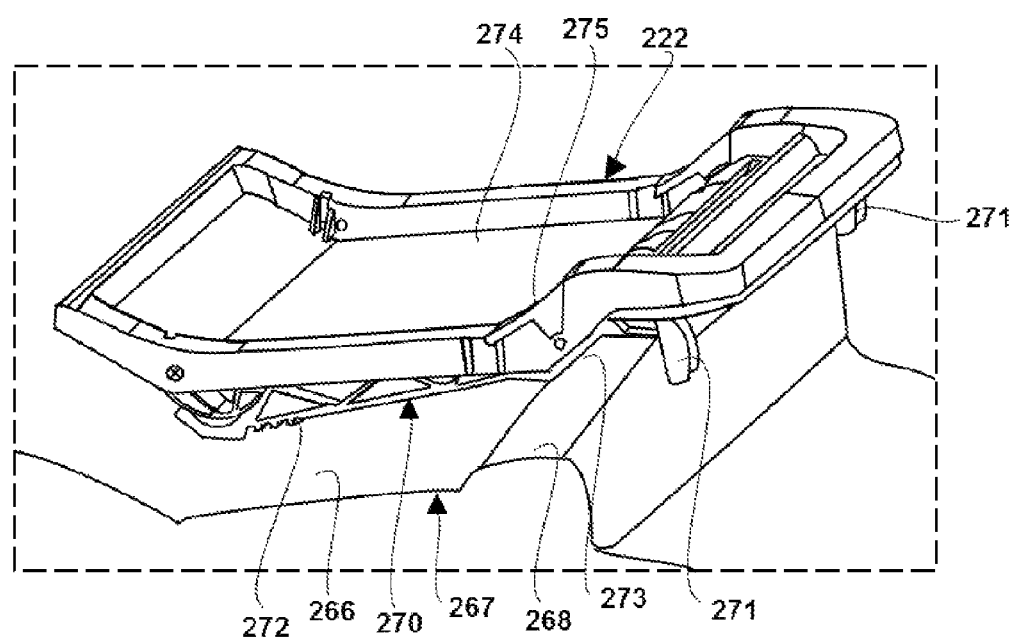
FIG. 19 is a perspective view of an exemplary base and cushion pan mounted on the floor pan of FIG. 18.

Referring now to FIG. 19, the rear seat includes a base 270 having front legs 271 engaging the front of the anti-submarine hump 268 and a back section 272 secured to the raised section 266 of the floor pan 267 rearward of the anti-submarine hump 268. The base 270 is preferably snap-fit onto the floor pan 267, but it could alternately be secured to the floor pan 267 through mechanical fasteners, welding, brazing, etc. The base 270 includes an inclined section 273 which engages and abuts the back of the anti-submarine hump 268.

As will be discussed in further detail below, a cushion pan 274 of a lower cushion 222 is slidably coupled to the base 270. The cushion pan 274 includes an inclined section 275 which is disposed adjacent to the inclined section 273 of the base 270 discussed above. In the event of a front-collision of the vehicle, force is transferred from the lower cushion 222, through (or bypassing) the base 270, and into the anti-submarine hump 268, thus preventing the rear seat from being dislodged from the floor pan 267 of the vehicle and flying forwardly into the front seats. Thus, the vehicle seat advantageously utilizes the anti-submarine hump 268 of the floor pan 267 to protect the occupants in the second row of seats during a front impact collision.

Figure 20:
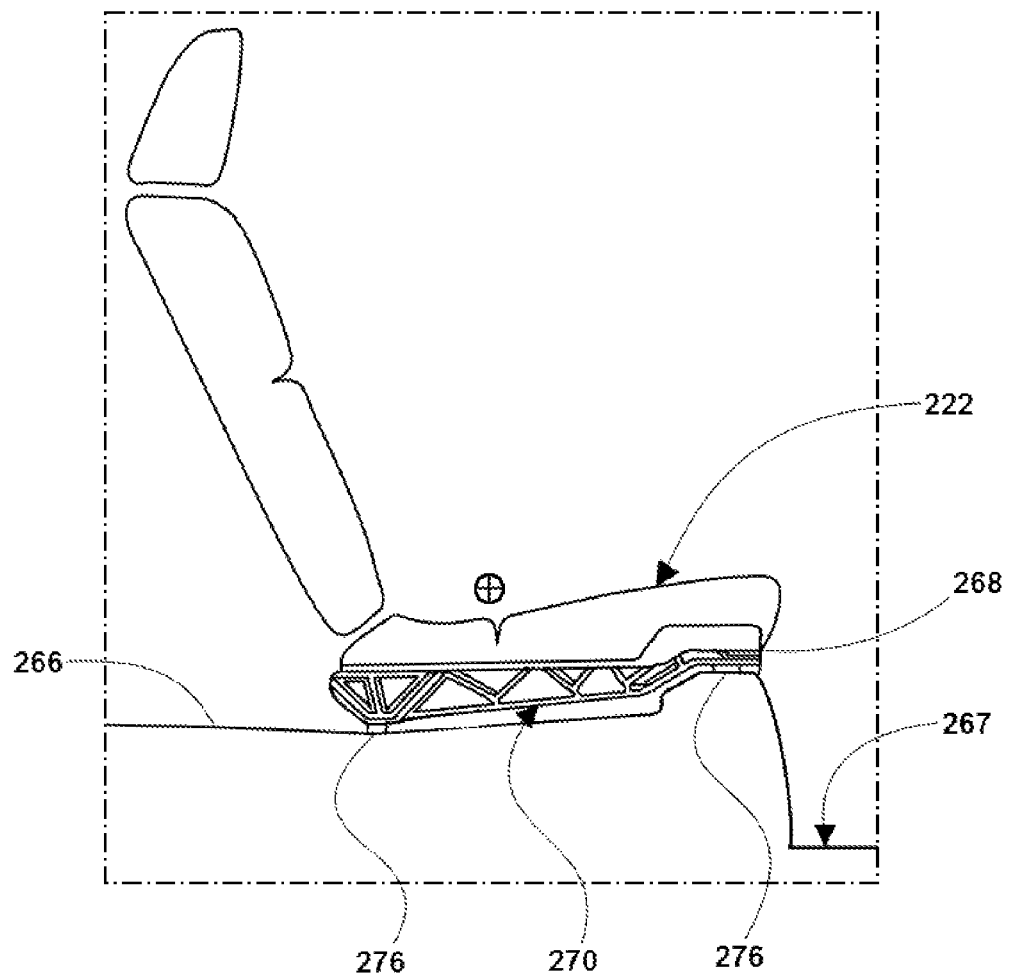
FIG. 20 is a side view of an exemplary seat assembly mounted on the floor pan of FIG. 18 and in a non-inclined position.
Figure 21:
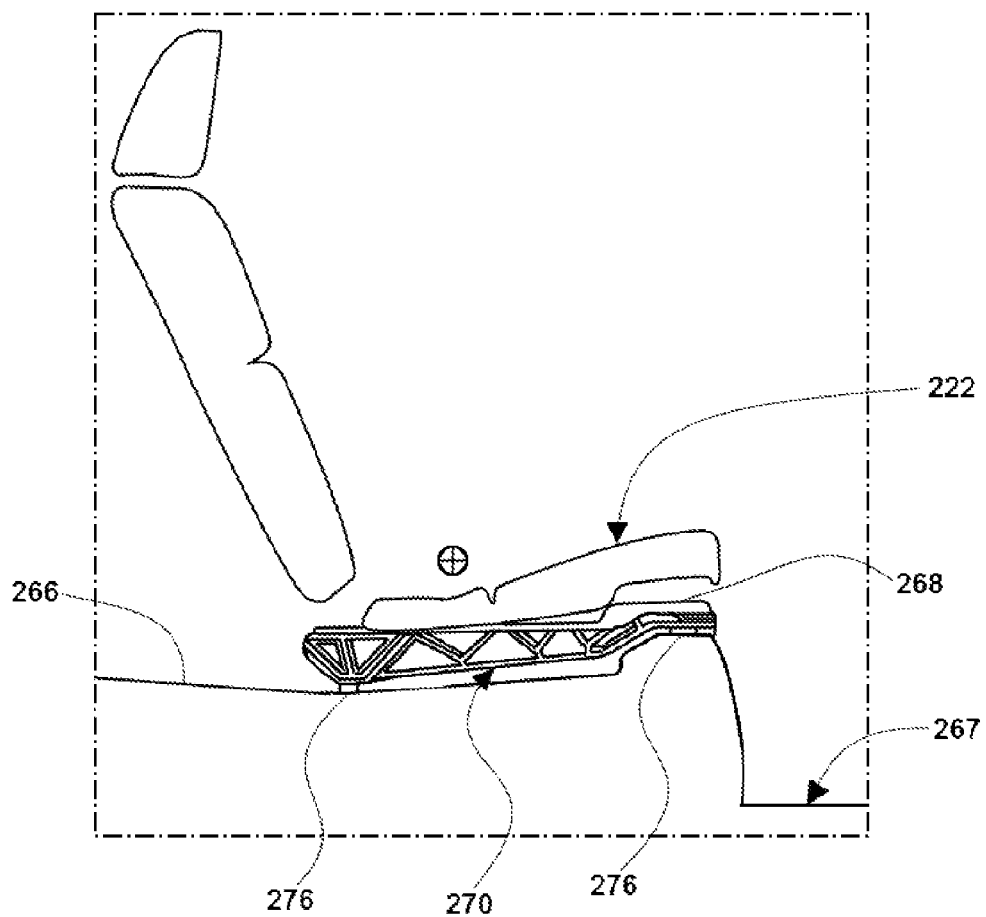
FIG. 21 is a side view of the exemplary seat assembly of FIG. 20 and in an inclined position.

Referring now to FIGS. 20 and 21, the lower cushion 222 can rock, or tilt, relative to the base 270 between different inclined orientations. This motion is similar to tilting described above in conjunction with the other exemplary embodiments and can be used to configure the seat to comfortably accommodate virtually any size of occupant with sufficient thigh support. The exemplary lower cushion 222 is shown in a least inclined orientation in FIG. 20, which might be preferred for a short occupant, and in a most inclined orientation in FIG. 21, which might be preferred for a tall occupant.

Figure 22:
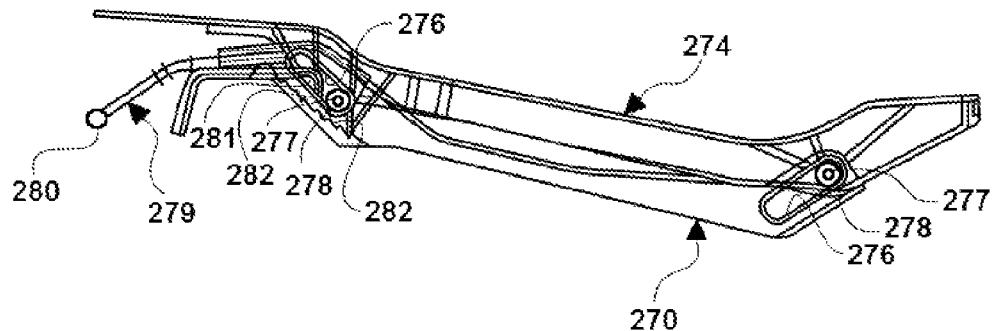
FIG. 22 is a cross-sectional view showing the interconnection between the lower cushion and the base of the seat assembly of FIG. 19 and with a braking mechanism being in an engaged position.
Figure 23:
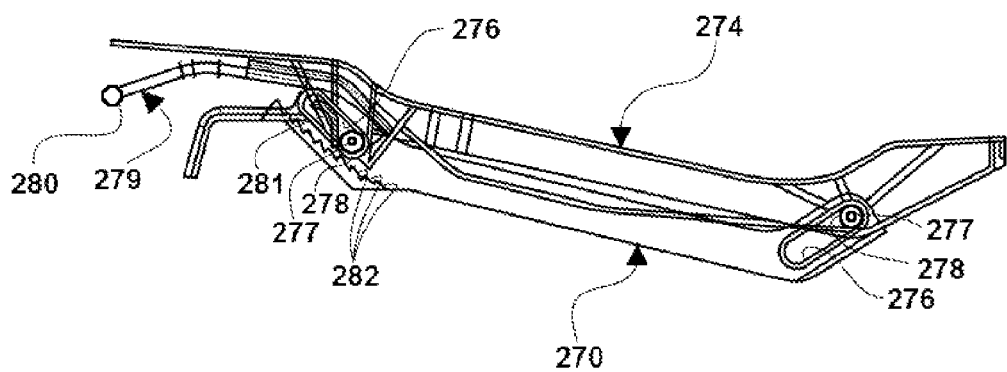
FIG. 23 is another cross-sectional view showing the interconnection between the lower cushion and the base of the seat assembly of FIG. 19 and with the braking mechanism being in a disengaged position.

Referring now to FIGS. 22 and 23, the base 270 includes a track in the form of a pair of angled surfaces, or slots 276, spaced from one another and disposed on at least one of the side walls of the base 270. The slots 276 are also angled relative to one another and relative to the floor pan 267, and the cushion pan 274 is operably coupled to these slots 276 with a pair of pins 277 for sliding and rocking relative to the base 270. The slots 276 define predetermined limits for the movement of the lower cushion 222 relative to the base 270. A roller 278 is disposed about each pin 277, and each roller 278 has a diameter similar to the width of the slot 276, thus allowing the cushion pan 274 to rock smoothly relative to the base 270. The rollers 278 are preferably of a low friction material, such as nylon.

The seat also includes a braking mechanism 279, best shown in FIGS. 22 and 23, which is movable between a disengaged position for adjusting the lower cushion 222 within the predetermined limits established by the slots 276 and an engaged position for restricting movement of the lower cushion 222 relative to the base 270. The exemplary braking mechanism 279 includes a towel bar 280 extending forwardly of the seat for the occupant to grab and a generally V-shaped bracket 281 interconnecting the towel bar 280 with the rollers 278 of the cushion pan 274. The base 270, on the other hand, includes a resistance element in the form of a plurality of teeth-like grooves 282 disposed adjacent to the slots 276. The towel bar 280 is biased by a spring (not shown) into the engaged position shown in FIG. 21 with a sliding element of the cushion pan 274 engaging the grooves 282 of the base 270, which thereby locks the cushion pan 274 to the base 270. When the occupant wants to adjust the orientation of the lower cushion 222, he or she simply raises the towel bar 280 to the disengaged position shown in FIG. 23, thereby releasing the sliding element of the cushion pan 274 from the grooves 282 of the base 270 and adjusts the lower cushion 222 to the desired orientation before releasing the towel bar 282. If the slots 276 are both angled relative to one another and relative to the floor pan 267, then while sitting in the lower cushion 222, the occupant simply allows the system to re-orient the lower cushion 222 under his or her thigh. However, if the occupant desires a different angle, then he or she merely has to tilt his or her thigh into the desired orientation Such a type of braking mechanism 279 is beneficial because the engagement between the cushion pan 274 and the base 270 is primarily in a compressive, not shearing manner, and thus, is increased in the event of a front-impact collision when the weight of the occupant is thrown forwardly against the front of the lower seat cushion 222.

It should be appreciated that a wide range of alternate braking mechanisms could be employed to hold the cushion pan 274 to the base 270. One such braking mechanism utilizes a V-shaped interface (not shown) to increase mechanical advantage of the braking element by releasing with the towel bar 280, thereby allowing the lower cushion 222 to be adjusted to virtually any position within the constraints of the slots 276, not just the positions defined by the teeth or grooves 282 of the base 270. Alternately, the cushion pan 274 and the base 270 could each be provided with high-friction, micro-textured surfaces which engage one another when the towel bar 280 is in the engaged position, thereby using friction to lock the cushion pan 274 to the base 270. Such a friction-based braking mechanism is also beneficial because the normal force between the high friction surfaces of the cushion pan 274 and the base 270 is increased when an occupant is sitting in the lower cushion 222 and is further increased in the event of a front-impact collision when the occupant is thrown forwardly into the front of the lower cushion 222.

Figure 24:
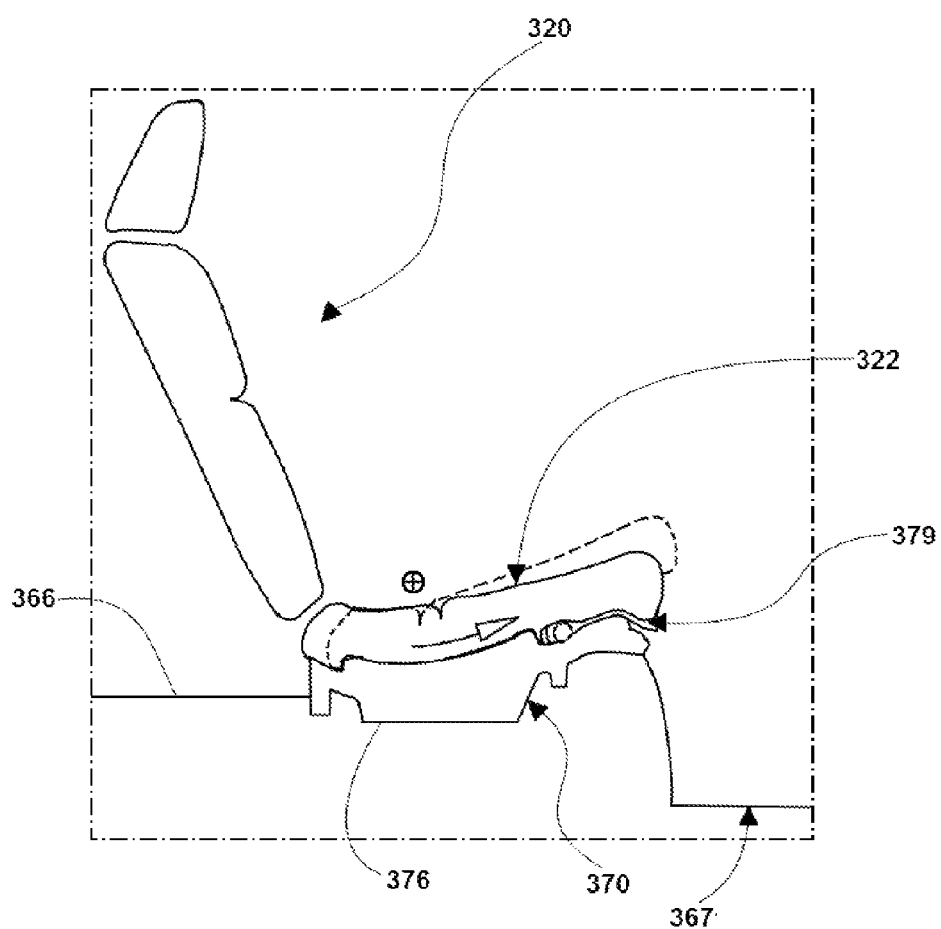
FIG. 24 is a side view of an alternate seat assembly mounted on the floor pan of a vehicle.

FIG. 24 is a side view of an alternate seat assembly 320 mounted on the floor pan 367 of a vehicle. The base 370 is mounted to the raised portion 366 of the floor pan 367. The base 370 has a concave shape and includes a track 376 extending through an arc. The lower cushion 322 is operably coupled to the track 376 for sliding along the track 376 relative to the base 370. Because the track 376 has an arcuate shape, when the lower cushion 322 slides longitudinally forward, it also rocks upwardly relative to the base 370. A braking mechanism 379 locks the lower cushion 322 to the base 370, and a towel bar 381 moves between an engaged position for restricting movement of the lower cushion 322 relative to the base 370 and a disengaged position for allowing the lower cushion 322 to move along the track 376.

Figure 25:
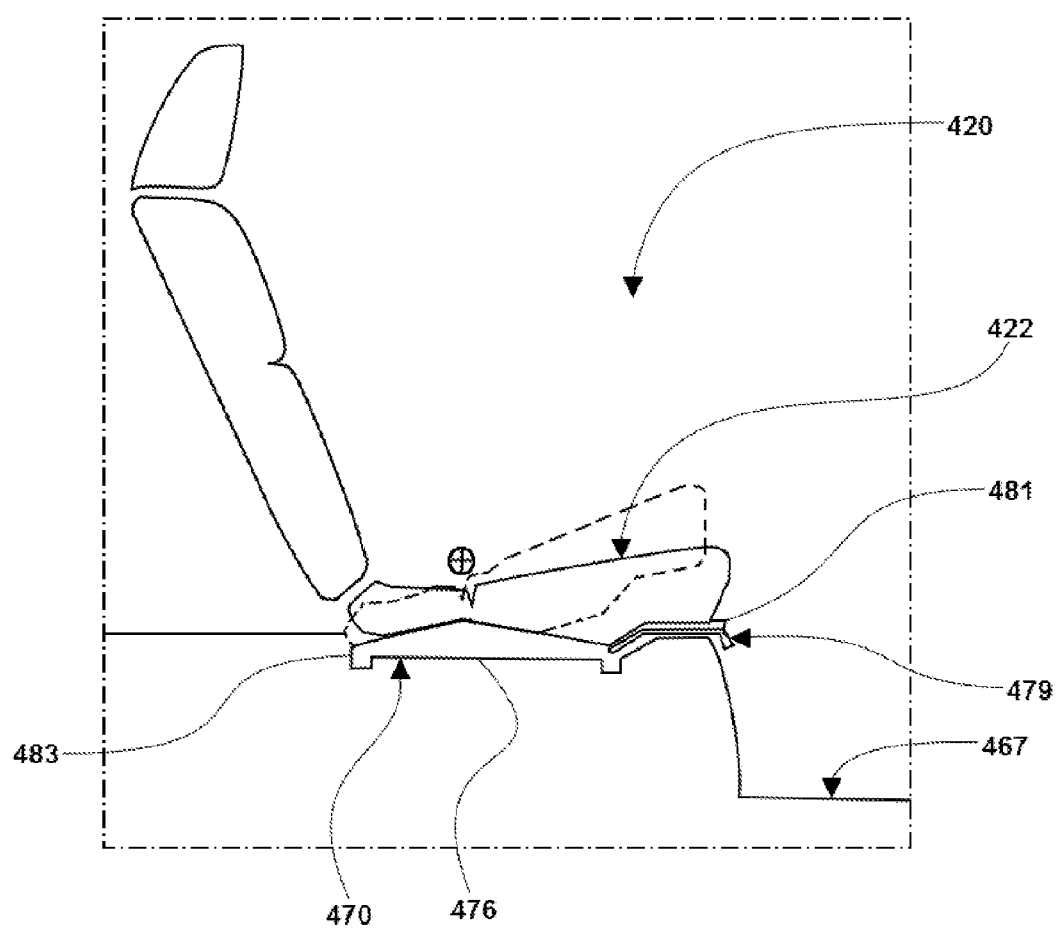
FIG. 25 is a side view of yet another alternate seat assembly mounted on the floor pan of a vehicle.

FIG. 25 is a side view of yet another seat assembly 420 mounted on the floor pan 467 of a vehicle. The base 470 has a generally obtuse triangular shape with a track in the form of a pivot point 476 at its apex. The lower cushion 422 engages the base 470 at the pivot point 476, and the back of the lower cushion 422 is configured to rock relative to the base 470 about the pivot point 476. The seat assembly 420 also includes a braking mechanism 479 for locking the lower cushion 422 to the base 470 including a towel bar 481 moveable between an up position for allowing the lower cushion 422 to rock relative to the base 470 and a down position for restricting movement of the lower cushion 422 relative to the base 470. Additionally, the back of the lower cushion 422 is inclined to accommodate the rocking described above.

The foregoing invention has been described in accordance with the relevant legal standards, thus the description is exemplary rather than limiting in nature. Variations and modifications to the disclosed embodiment may become apparent to those skilled in the art and fall within the scope of the invention.

We claim:

1. A seat for a vehicle having a floor pan with an anti-submarine hump, said seat comprising:
   a base configured to be coupled to the floor pan and the anti-submarine hump without intervening slidable tracks that allow fore and aft movement of the seat, the base being supported by the floor pan and the anti-submarine hump, presenting enclosed slots each having an angular surface and wherein the angular surface are opposing and spaced from one another and wherein said base and slots are coupled above the anti-submarine hump;
   a cushion having a cushion pan slidably engaging said opposing angular surfaces of said base for tilting relative to said base to an alternate orientation;
   a seat back and wherein said cushion is capable of moving slidably relative to said base and independent of said seat back; and
   a resistance element for maintaining the cushion in a desired orientation relative to said base and wherein said cushion compressively engages at least one of said resistance element and said base to prevent movement of said cushion relative to said base, and wherein said cushion is raised from compressive engagement to allow movement of said cushion relative to said base.

2. The seat as set forth in claim 1 wherein said cushion includes a sliding element being movable between a disengaged position for adjusting said cushion within predetermined limits and an engaged position interfacing with said resistance element such that said cushion is restricted from movement relative to said base.

3. The seat as set forth in claim 2 wherein an interface between said sliding element and said resistance element is a frictional interface.

4. The seat as set forth in claim 3 wherein said cushion engages each of said slots with a pin and a roller.

5. The seat as set forth in claim 2 further including a towel bar coupled to said sliding element for moving said sliding element between said disengaged and engaged positions.

6. The seat as set forth in claim 1 wherein said opposing angular surfaces of said base are a pair of slots spaced from one another.

7. The seat as set forth in claim 1 wherein said opposing angular surfaces are angled both relative to one another and to the floor of the vehicle.

8. The seat as set forth in claim 1 wherein the anti-submarine hump has a profile and wherein said base includes a profile that is configured to at least partially engages the anti-submarine hump.

9. The seat as set forth in claim 1 wherein said resistance element includes a towel bar and further includes grooves on said base engaging said cushion pan and wherein said towel bar is configured to lift said cushion pan from engagement with said grooves in a released condition and lower said cushion pan into a compressive engagement between said base and said cushion pan in an engaged position.

10. A seat for a back row of a vehicle having a floor, said seat comprising:
    a base without intervening slidable tracks that allow fore and aft movement of the seat, said base presenting enclosed slots each having opposing angular surfaces spaced from one another;
    a cushion engaging and supported by said base;
    a seat back and wherein said cushion is capable of moving slidably relative to said base and independent of said seat back; and
    wherein said cushion includes a sliding element being movable between a disengaged position by lifting said cushion from compressive engagement for adjusting the orientation of said cushion within predetermined limits set by said enclosed slots and an engaged position interfacing with a resistance element such that said cushion is restricted from movement by compressive force of said cushion relative to said base.

11. The seat as set forth in claim 10 wherein said cushion engages each of said angular surfaces on said base for tilting relative to said base to an alternate orientation.

12. The seat as set forth in claim 11 wherein an interface between said sliding element and said resistance element is a frictional interface.

13. The seat as set forth in claim 11 wherein said enclosed slots engage a roller from said cushion and said slots constrain movement of said roller.

14. The seat as set forth in claim 13 wherein said roller rotates about a pin coupled to said cushion pan.

15. The seat as set forth in claim 10 wherein said seat includes opposing angular surfaces angled both relative to one another and to the floor of the vehicle.

16. The seat as set forth in claim 10 further including a towel bar coupled to said sliding element for moving said sliding element between said disengaged and engaged positions.

17. The seat as set forth in claim 10 wherein the floor includes an anti-submarine hump and said seat further comprises wherein said base is configured to at least partially engage the anti-submarine hump, with the base angling upward and forward proximate to a front of the seat.

* * * * *